United States Patent [19]

Inaba et al.

[11] Patent Number: 5,455,112
[45] Date of Patent: Oct. 3, 1995

[54] MAGNETIC RECORDING MEDIUM

[75] Inventors: Hiroo Inaba; Kiyomi Ejiri, both of Kanagawa, Japan

[73] Assignee: Fuji Photo Film Co., Ltd., Kanagawa, Japan

[21] Appl. No.: 10,846

[22] Filed: Jan. 29, 1993

[30] Foreign Application Priority Data

Jan. 31, 1992 [JP] Japan .................................. 4-040509

[51] Int. Cl.$^6$ .................................. B32B 5/16; G11B 5/66
[52] U.S. Cl. .......................... 428/323; 428/328; 428/329; 428/331; 428/332; 428/336; 428/693; 428/694 B; 428/694 BS; 428/694 BN; 428/694 BM; 428/702; 428/900; 428/928; 427/127; 427/128; 427/130; 427/131
[58] Field of Search .................................. 428/323, 694 B, 428/694 BS, 694 BN, 900, 694 BM, 693, 328, 329, 331, 332, 336, 702, 928; 427/127, 128, 130, 131

[56] References Cited

U.S. PATENT DOCUMENTS

| | | | |
|---|---|---|---|
| 4,587,157 | 5/1986 | Brock et al. | 428/216 |
| 4,746,558 | 5/1988 | Shimozawa et al. | 428/141 |
| 4,863,793 | 9/1989 | Ogawa et al. | 428/323 |
| 4,874,633 | 10/1989 | Komatsu et al. | 427/48 |
| 4,963,433 | 10/1990 | Ogawa et al. | 428/323 |
| 5,336,559 | 8/1994 | Yamagishi | 428/329 |
| 5,358,777 | 10/1994 | Kojima | 428/212 |
| 5,389,418 | 2/1995 | Ota | 428/64 |

FOREIGN PATENT DOCUMENTS

| | | |
|---|---|---|
| 62-222427 | 9/1987 | Japan . |
| 1119916 | 5/1989 | Japan . |

*Primary Examiner*—L. Kiliman
*Attorney, Agent, or Firm*—Sughrue, Mion, Zinn, Macpeak & Seas

[57] ABSTRACT

A magnetic recording medium produced by providing a lower non-magnetic layer comprising a non-magnetic powder dispersed in a binder on a non-magnetic support followed by providing, while the lower non-magnetic layer is still wet, an upper magnetic layer comprising a ferromagnetic powder dispersed in a binder on the lower non-magnetic layer, wherein a mean thickness of the upper magnetic layer is 1.0 μm or less and the non-magnetic powder in the lower non-magnetic layer comprises (A) a granular inorganic powder having a mean particle size of from 0.01 to 0.08 μm, (B) a carbon black powder having a mean particle size of from 0.01 to 0.04 μm and (C) a powder component having a larger mean particle size than the mean particle size of each of powders (A) and (B). The magnetic recording medium has good electromagnetic characteristics and has excellent running durability with little edge damage after repeated running.

10 Claims, No Drawings

MAGNETIC RECORDING MEDIUM

FIELD OF THE INVENTION

The present invention relates to a magnetic recording medium, especially to one having an extremely thin magnetic layer having a mean thickness of 1.0 μm or less. More precisely, it relates to a coating type magnetic recording medium having excellent running property.

BACKGROUND OF THE INVENTION

Magnetic recording media are widely used as a sound recording tape, video tape, computer tape, recording disc and the like. Ever-increasing demands have had to be met for increased magnetic recording density and shortened (higher frequency) recording wavelength. The recording system for these devices varies from an analogue system to a digital system. In response to the current demand for elevation of the magnetic recording density of the recording medium, a magnetic recording medium having a thin metal film, e.g., vapor-deposited, as the magnetic layer has been proposed. However, in view of the more facile productivity and practical reliability against corrosion or the like, a so-called coating type magnetic recording medium is nonetheless preferred. In a coating type magnetic recording medium, a dispersion of a ferromagnetic powder in a binder has been coated on the support. However, since a coated medium has a relatively low filling degree with respect to the magnetic substance, as compared with a medium having a thin metal film, the former is inferior to the latter with respect to the electromagnetic characteristic.

In any event, a widely used coating type magnetic recording medium comprises a dispersion of a ferromagnetic iron oxide, Co-modified ferromagnetic iron oxide powder, $CrO_2$ powder or ferromagnetic alloy powder that has been coated on a non-magnetic support to form a magnetic layer thereon.

In order to improve the electromagnetic characteristic of such a coating type magnetic recording medium proposals have included, for example, improvement of the magnetic characteristic of the ferromagnetic powder added to the magnetic layer of the medium and smoothing of the surface of the medium. However, these proposed methods are not adequate to sufficiently elevate the magnetic recording density of the medium.

Recently, the recording wavelength for a coating type magnetic recording medium is being shortened concomitantly with elevation of the magnetic recording density of the medium. As a result, if the thickness of the coated magnetic layer is large, problems of self-demagnetization demagnetization loss in recording with a lowered output arise and thickness loss in reproduction are serious.

Therefore, in response, reduction in the thickness of the magnetic layer has been attempted. If, however, the thickness of the magnetic layer is reduced to about 2 μm or less, the surface of the magnetic layer would often be influenced by the non-magnetic support so that the electromagnetic characteristic and drop-out of the medium would worsen. However, the influence of the rough surface of the support would be avoided if a thick non-magnetic undercoating layer is provided on the surface of the support and then a magnetic layer is coated over the undercoating layer as an upper layer, as proposed in JP-A 57-198536 (the term "JP-A" as used herein means an "unexamined published Japanese patent application"). However, that method still has a problem in that the head abrasion resistance and the head durability worsen. The problem is considered attributable to the fact that a thermosetting resin is used as a binder in the non-magnetic lower layer. As a consequence, the lower layer is hardened so that the friction between the magnetic layer and head, as well as the contact of the magnetic layer with other parts, are effected under no buffer condition. The magnetic recording layer having such a lower layer has poor flexibility.

In order to avoid the problem, the use of a non-hardening resin as a binder in the lower layer is conceivable.

In accordance with the conventional method where the lower layer is coated and dried and then the magnetic layer is coated thereover as an upper layer, however, the lower layer would be swollen by the organic solvent in the coating solution for the upper layer to cause turbulence of the coating solution for the upper layer. As a result, the surface property of the magnetic layer would thereby be worsened and the electromagnetic characteristic of the medium would thereby be lowered. However, in order to reduce the thickness of the magnetic layer, reduction of the amount of the magnetic coating solution for the upper layer, or reduction of the concentration of the magnetic coating solution by adding a large amount of a solvent thereto, may be envisioned. In the former case of reducing the amount of the coating solution for the magnetic coating layer, however, drying of the coated layer would start before allowing sufficient leveling time to pass after the coating .to cause another problem of coating defects of giving streaks or stamped patterns on the surface of the magnetic layer coated. As a result, the yield of the method would be extremely low.

On the other hand, in the latter case of using a magnetic coating solution having a low concentration, the coated film would be highly porous so that sufficient filling degree of a magnetic substance in the film could not be attained, and additionally, the strength of the coated film would be insufficient as the film is too porous. In short, both methods mentioned above have various unfavorable problems. Also, in the invention of JP-A-62-154225, poor yield is a serious problem left unresolved.

The present applicant has already proposed, as one means of overcoming the above problems, a method of simultaneous multi-coating system where a non-magnetic lower layer is provided and, while the lower layer is still wet, an upper magnetic layer containing a ferromagnetic powder is provided over the lower layer, as described in JP-A-63-191315 (corresponding to U.S. Pat. No. 4,963,433) and JP-A-63-187418 (corresponding to U.S. Pat. No. 4,863, 793). This technique yields a magnetic recording medium with high producibility, wherein the medium is free from coating defects and has elevated productivity, improved electromagnetic characteristics such as output and C/N ratio and improved running durability.

In accordance with the conventional method, however, it is still difficult to satisfy the current demand for a high-recording density magnetic recording medium having a thin coated layer suited for extended use, in particular, for such a device having a thin magnetic layer having a thickness of 1 μm or less. That is, if such a thin high-recording density magnetic recording medium is prepared by the conventional method, the medium has coating defects and another problem that both the electromagnetic characteristic and the running durability could not be satisfied well. In particular, when the running durability of a thin tape is desired to be increased, reduction of damage of the tape edge is necessary. However, the conventional method could not satisfy the demands.

SUMMARY OF THE INVENTION

The object of the present invention is to provide a magnetic recording medium having good electromagnetic characteristics and having excellent running durability with little edge damage after repeated running.

Specifically, in order to attain this object, the present invention provides a magnetic recording medium produced by providing a lower non-magnetic layer comprising a non-magnetic powder dispersed in a binder on a non-magnetic support followed by providing, while the lower non-magnetic layer is still wet, an upper magnetic layer comprising a ferromagnetic powder dispersed in a binder on the lower non-magnetic layer, wherein the mean thickness of the upper magnetic layer is 1.0 µm or less and the non-magnetic powder in the lower non-magnetic layer comprises (A) a granular inorganic powder having a mean particle size of from 0.01 to 0.08 µm, (B) a carbon black powder having a mean particle size of from 0.01 to 0.04 µm and (C) a powder component having larger mean particle size than the mean particle size of each of powders (A) and (B).

DETAILED DESCRIPTION OF THE INVENTION

In producing a magnetic recording medium in accordance with the present invention, a lower non-magnetic layer (hereinafter referred to as a "non-magnetic layer" or a "lower layer") is provided on a non-magnetic support and, while the non-magnetic layer is still wet, an upper magnetic layer (hereinafter referred to as a "magnetic layer" or an "upper layer") is provided over the non-magnetic layer so that the yield of production of the medium is elevated. Specifically, the mean thickness of the magnetic layer of the medium of the present invention is defined to be 1 µm or less so that self-demagnetization may be reduced and the output to be applied to the medium may be elevated.

In addition, the dispersibility of the non-magnetic layer may be elevated and the surface smoothness of the layer may be improved by adding the granular inorganic powder (A) to the layer. However, if the content of (A) in the non-magnetic layer is too great, the porosity of the layer would be small so that the layer would be too dense and brittle and, as a result, the layer would have poor electroconductivity. Due to the small porosity, the layer would not be effective to supplement of a lubricating agent thereto. However, by addition of the carbon black (B), the layer may have suitable porosity and electroconductivity.

A thin tape often suffers from edge damage. However, by addition of the coarse third component powder (C) to the layer, the edges of the tape may have suitable projections and depressions to be suitably rough so that the friction resistance of the edges thereof may be reduced. As a result, a high output of 7 MHz may be applied to the medium of the present invention, and additionally, the medium is improved to have high C/N characteristic, excellent still durability and excellent running durability.

In accordance with the present invention, the powder composition of the lower non-magnetic layer of the recording magnetic medium has been specifically defined so that the dynamic characteristic of the magnetic recording medium is controlled to inhibit edge damage of the magnetic recording medium and additionally the electro-magnetic characteristic of the medium in short-wavelength recording is improved.

Production of the medium of the present invention is characterized in that the kind of the non-magnetic powder used in the coating solution for the lower non-magnetic layer is specifically selected and used in order that an upper magnetic layer having an extremely small dry thickness, especially having a dry thickness of 1 µm or less, may be provided on the lower non-magnetic layer with no coating defects and that the upper layer is over-coated over the lower layer previously coated on a non-magnetic support while the lower layer on the support is still wet. Accordingly, the present invention provides a magnetic recording medium suited for industrial mass-production having no coating defects such as pin holes or streaks, and the medium has an extremely thin magnetic layer having a capability comparable to a ferromagnetic metal layer, and having excellent running durability with little edge damage.

For the purpose of better ensuring the excellent electromagnetic characteristic and the improved running durability of the magnetic recording medium of the present invention, the size of the constitutive powders (A), (B) and (C) and the kind and shape of the materials of them are specifically selected and defined.

Precisely, the non-magnetic powder to be in the lower non-magnetic layer of the medium of the present invention comprises at least a granular inorganic powder (Powder A) having a mean particle size of from 0.01 to 0.08 µm, preferably from 0.02 to 0.06 µm, a carbon black powder (Powder B) having a mean particle size of from 0.01 to 0.04 µm, preferably from 0.015 to 0.03 µm, and a third component powder (Powder C) which has a larger mean particle size than powder (A) and the powder (B).

The powder (A) is granular, which means that the particles constituting it are such that the ratio (long axis/short axis) in the length of the two axes, as freely selected from the constituting particles, falls within the range of generally from 0.6 to 1.4, preferably from 0.8 to 1.2. Specifically, it means that tabular or acicular particles are excluded from the powder (A). If the powder (A) is not granular, the dispersibility of the coating solution would be poor so that, when the solution is coated, a smooth surface of a coated layer could not be obtained unfavorably.

For purposes of this invention, the mean particle size of the powders means either a mean value of the diameter of powder particles when the powders have a granular or polyhedral shape, or a mean value of the length of the longest axis of the powder particles when the powders have an acicular or tabular shape, as obtained by observation with a transmission electronic microscope. The same definition of mean particle size shall apply to the other powders to be used in the present invention having powder shapes akin to any of the above-mentioned categories.

The powder (C) is not specifically limited in kind or physical geometry, provided that it has a larger mean particle size than the powder (B) and the powder (A). Preferably, it is selected from the following categories of materials (1) to (3). The powder (C) to be selected preferably has a Mohs' hardness of generally 4 or more, preferably 5 or more, and a specific gravity of generally from 2 to 6, preferably from 3 to 5.

(1) Granular or polyhedral powder having a mean particle size of from 0.07 µm to less than 1 µm:

The granular or polyhedral powder means to specifically exclude a tabular or acicular powder. Examples of the granular or polyhedral powder include a spherical powder or a regular polyhedral or irregular polyhedral powder in which the constitutive plane of each particle is selected from one or more regular n-angles such as regular square, regular 5-angle and regular 6-angle or from one or more irregular n-angles. A preferred powder is one having a ratio (long axis/short axis) in the length of the freely selected two axes which is within the range of preferably from 0.6 to 1.4, more preferably from 0.8 to 1.2. The mean particle size of the powder is preferably within the range of from 0.1 to 0.5 μm.

(2) Acicular powder having a mean length in the short axis of from 0.05 μm to less than 1 μm and having an aspect ratio of 10 or more:

The aspect ratio means a ratio of mean long axis/mean short axis of each particle of this category. Preferred examples of the acicular powder of this kind include α-iron oxide, α-goethite, $TiO_2$, asbestos, ZnO, potassium titanate and silica.

More preferably, the mean short axis of the powder is from 0.1 to 0.5 μm and the aspect ratio thereof is from 10 to 50.

(3) Tabular powder having a tabular diameter of from 0.1 μm to less than 2 μm and an aspect ratio of 10 or more:

The aspect ratio means a ratio of tabular diameter/tabular thickness of each particle of this category. Preferred examples of the tabular powder of this kind include graphite, talc powder, MIO (mica iron oxide), kaolin and clay.

More preferably, the mean tabular diameter of the powder is from 0.15 to 1 μm and the aspect ratio thereof is from 10 to 100.

The above-mentioned powders (1) to (3) may be used singly or in combination of them as the powder (C) in the present invention.

In the present invention, the non-magnetic powder used in the lower non-magnetic layer preferably comprises only the powder (A), the powder (B) and the powder (C), in which the volume proportion of the powder (A) is desired to be from 40 to 80%, preferably from 45 to 75%, that of the powder (B) is from 15 to 40%, preferably from 25 to 35%, and that of the powder (C) is from 2 to 26%, preferably from 5 to 20%. The volume proportion means the proportion of each powder component to the total volume of the non-magnetic powder in the lower layer. Specifically, the sum of the respective volume proportions of the powder (A), the powder (B) and the powder (C) is preferred to represent 100% of the total volume of non-magnetic powder in the lower layer. If desired, however, the non-magnetic powder may additionally contain any other inorganic or organic non-magnetic powder component in a range of attaining the object of the present invention, generally in a range of 15% or less.

The powder volume content of the non-magnetic powder of the lower layer is preferably from 20 to 60%, especially preferably from 22 to 50%, based on the total volume of the lower layer.

In order to improve the electromagnetic characteristics of the magnetic recording medium of the present invention, it is desired that the dispersibility of the coating solution for the lower layer is good and that the surface smoothness of the over-coated layer is good. For this purpose, the non-magnetic powder for the lower layer is desired to have a large content of the powder (A). This is because the powder (A) has a smaller specific surface area than the powder (B), and thus powder (A) has less adhesion of powder particles to each other than the powder (B). Therefore, powder (A) has a greater influence on the dispersibility of the non-magnetic powder solution for the lower layer.

However, if the amount of powder (A) is too great and the amount of powder (B) is too small, the lower layer formed would have poor porosity and would be dense, so that the magnetic recording medium having such a dense lower layer would be brittle. As a result, the still durability of the medium would be insufficient, powder dropping from the medium would often occur, the electro-conductivity of the medium would be poor, and the medium would often suffer from running hindrance under electric charge. Additionally, since the porosity of lower layer would be low, supplements of a lubricant thereto would be insufficient so that the still durability of the medium would worsen. Under this situation, in order to ensure suitable porosity and electroconductivity of the lower layer, the amount of the powder (B) in the lower layer is increased. However, if the content of the powder (B) is too great, the dispersibility of the powder solution of forming the lower lower would be insufficient and the shrinkage of the lower layer would noticeably differ from that of the upper magnetic layer to cause curling of the medium having them.

By suitably admixing the powder (A) and the powder (B), the problem may be buffered. However, using only the powder (A) and the powder (B), even in a judicious manner, are not satisfactory for attaining sufficient running durability of the medium to often cause edge damage especially in a thin tape having a medium thickness of 15 μm or less.

Therefore, the powder (C) is added to the lower layer so as to solve this problem. Due to addition of the powder (C), it is believed that the edges of a tape with the medium may have suitable projections and depressions to be properly roughened so that the friction resistance of the edges may thereby be reduced by the function of powder (C).

Therefore, the kind and the size of the constitutive powders of the non-magnetic powder for the lower layer are defined in the present invention as mentioned above. In addition, the volume proportion of the constitutive powders is also defined in the manner as mentioned above, whereby the electromagnetic characteristic, the still durability and the running durability of the medium of the present invention are all well satisfied.

Therefore, the powder (C) preferably should have the volume proportion falling within the range as defined above. If the volume proportion of the powder (C) is too high, the dispersibility of the non-magnetic powder composition for the lower layer would worsen to lower the surface smoothness of the medium and, as a result, the electromagnetic characteristic of the medium is thereby lowered. On the contrary, if the volume proportion of the powder (C) is too small, powder dropping from the edges of a tape with the medium would be great so that the running durability could not be improved.

In the medium of the present invention, the powder (C) is desired to be exposed from the surfaces of the layer in some degree. Therefore, the thickness of the lower layer needs to be somewhat large. This thickness preferably is within the range of from 1 to 5 μm and particularly from 1.5 to 3.5 μm. If the thickness is less than about 1 μm, the powder (C) is overly exposed as protrusions to the overlying magnetic layer so that the surface property of the medium is unduly roughened. However, if the thickness is too large, adhesion of the powder (C) is lowered to cause a problem of powder dropping.

For examples, the granular or polyhedral powder for the powder (A) and the powder (C), category (1), to be used in the lower non-magnetic layer of the medium of the present invention is selected from the group consisting of non-magnetic inorganic powders of metals, metal oxides, metal carbonates, metal sulfates, metal nitrides, metal carbides and metal sulfides.

Examples of such granular or polyhedral powders for (A) and (C) include $TiO_2$ (rutile, anatase), $TiO_x$, cerium oxide, tin oxide, tungsten oxide, ZnO, $ZrO_2$, $SiO_2$, $Cr_2O_3$, α-alumina with alphatization of 90% or more, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $CaSO_4$, $BaSO_4$, silicon carbide and titanium carbide. These powders are selected and used, singly or in combination of two or more of them, in accordance with the above-mentioned conditions. As powder (A), preferred are titanium oxide, barium sulfate, silica, alumina, zinc oxide and α-iron oxide. As examples of granular or polyhedral powder for powder (C), α-alumina with alphatization of 90% or more, β-alumina, γ-alumina, α-iron oxide, $TiO_2$ (rutile, anatase), $CeO_2$, $SnO_2$, ZnO, $ZrO_2$, SiC, TiC, $SiO_2$, $Cr_2O_3$, BN, $MoS_2$ and $WO_2$ are preferred.

As the inorganic powders mentioned above, those having the properties mentioned below are preferred. Preferred powders are those having a tap density (measured under the condition of numbers of tapping: 150 and head: 30 mm, using Tap density measuring instrument manufactured by Seishin Enterprise Inc.) of from 0.05 to 2 g/ml, preferably from 0.2 to 1.5 g/ml; a water content of from 0.1 to 5%, preferably from 0.2 to 3%; a pH value of from 2 to 11; a specific surface area of from 1 to 100 $m^2/g$, preferably from 5 to 50 $m^2/g$, especially preferably from 7 to 40 $m^2/g$; a crystal unit size of from 0.01 μm to 2 μm; an oil absorption with DBP of from 10 to 100 ml/100 g, preferably from 15 to 80 ml/100 g, more preferably from 20 to 60 ml/100 g; and a specific gravity of from 2 to 8, preferably from 3 to 6.

The above-mentioned inorganic powders need not necessarily be 100% pure. For instance, in accordance with the object desired, the surfaces of these powders may be treated with other compounds such as compounds of Al, Si, Ti, Zr, Sn, Sb and/or Zn to form oxides thereof on the surfaces thereof. In this case, the content of the substrate powders can be 70% or more so as not to reduce the effect of them. For instance, when titanium oxide is used as the powder, the surface is generally treated with alumina. The ignition loss of the powders is desired to be 20% or less. The Mohs' hardness is desired to be 3 or more.

Specific examples of the inorganic powder to be used in the present invention include UA5600 and UA5605 manufactured by Showa Denko K.K.; AKP-20, AKP-30, AKP-50, HIT-55, HIT-100 and ZA-G1 manufactured by Sumitomo Chemical Co.; G5, G7 and S-1 manufactured by Nippon Chemical Industry Co.; TF-100, TF-120, TF-140 and R516 by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R- 680 and TY-50 manufactured by Ishihara Sangyo Kaisha Ltd.; ECT-52, STT-4D, STT-30D, STT-30 and STT-65C manufactured by Titan Kogyo K.K.; T-1 manufactured by Mitsubishi Material Co., Ltd.; NS-0, NS-3Y and NS-8Y manufactured by Nippon Shokubai Kagaku Kogyo Co., Ltd.; MT-100S, MT-100T, MT-150W, MT-500B, MT-600B and MT-100E manufactured by Teika K.K.; FINEX-25, BF-1, BF-10, BF-20, BF-1L and BF-10P manufactured by Sakai Chemical Industry Co. Ltd.; DEFIC-Y and DEFIC-R manufactured by Dowa Mining Co., Ltd.; and Y-LOP manufactured by Titan Kogyo K.K.; and its calcined product.

As examples of powder (A), especially preferred is titanium oxide (particularly, titanium dioxide). A method of producing titanium oxide for the powder (A) will be described in detail hereafter.

For producing titanium oxide, a sulfuric acid method and a chlorine method are mainly employed. In a sulfuric acid method, raw ores of ilmenite are distilled with sulfuric acid to extract Ti and Fe as their sulfates; iron sulfate is removed by crystallization separation and the remaining titanyl sulfate solution is filtered and purified and then hot-hydrolyzed to give titanium oxide hydrate precipitates; the precipitates are filtered and washed and impurities are removed therefrom; and a particle size adjusting agent is added to the purified precipitates, which are then calcined at 80° to 1000° C. to give a crude titanium oxide. The product is grouped into a rutile titanium oxide and anatase titanium oxide due to the kind of the nucleating material to be added to the hydrolysis step. The crude titanium oxide is ground and treated for dressing the resulting particles, which are then surface-treated.

On the other hand, in a chlorine method, raw ores of natural rutile or synthetic rutile are chlorinated at a high temperature in a reducing atmosphere, whereby Ti is converted into $TICl_4$ and Fe into $FeCl_2$, and the cooled and solidified iron oxide is separated from the liquid $TICl_4$. The thus-obtained crude $TICl_4$ is purified by rectification, and a nucleating agent is then added thereto and is reacted instantaneously with oxygen at a temperature of 1000° C. or higher to give a crude titanium oxide. The finishing step of imparting a pigment-like property to the crude titanium oxide as obtained in the oxidative decomposition step is same as that in the above-mentioned sulfuric acid method.

The surface of the titanium oxide thus-obtained may be treated with various compounds as desired in the circumstances.

As powder (B), a carbon black powder is used in the present invention, which includes, for example, furnace black for rubber, thermal black for rubber, carbon black for coloration and acetylene black. It is preferred that the powder (B) has a specific surface area of generally from 100 to 500 $m^2/g$, preferably from 150 to 400 $m^2/g$, a DBP oil absorption of generally from 20 to 400 ml/100 g, preferably from 30 to 200 ml/100 g, a pH value of generally from 2 to 10, a water content of generally from 0.1 to 10%, and a tap density of generally from 0.1 to 1 g/ml.

Specific examples of the powder (B) include BLACK-PEARLES 2000, 1300, 1000, 900, 800, 880, 700 and VULCAN XC-72 manufactured by Cabot Co., Ltd.; #3050, #3150, #3250, #3750, #3950, #2400, #2300, #1000, #970, #950, #900, #850, #650, #40, MA40 and MA-600 manufactured by Mitsubishi Chemical Corporation; CONDUC-TEX SC manufactured by Columbia Carbon Co., Ltd.; 8800, 8000, 7000, 5750, 5250, 3500, 2100, 2000, 1800, 1500, 1255 and 1250 manufactured by RAVEN Co., Ltd.; and Ketjen Black EC manufactured by Agzo Co., Ltd. The carbon black may be surface-treated with a dispersing agent or may be grafted with a resin to partially graphatize the surface of it. If desired, the carbon black may previously be dispersed in a binder prior to its addition to the non-magnetic coating solution for the lower layer. The above-mentioned carbon blacks may be used singly or as a mixture of two or more of them.

As specific examples of the carbon black described herein for use in the present invention, reference can be had to the Handbook of Carbon Black (published by Carbon Black Association).

If desired, a non-magnetic organic powder may be incorporated into the lower layer of the medium of the present invention. Examples of suitable non-magnetic organic powders include an acryl-styrene resin powder, a benzoguanamine resin powder, a melamine resin powder and a phthalocyanine pigment powder. Also usable organic powders are a polyolefin resin powder, a polyester resin powder, a polyamide resin powder, a polyimide resin powder, and a polyethylene fluoride resin powder. For methods of producing these powders, JP-A-62-18564 and JP-A- 60-255827 may be referred to.

The proportion of the inorganic and organic non-magnetic powder used in the lower layer of the present invention is generally from 20 to 0.1 by weight and is from 10 to 0.1 by volume, based on the amount of binder in the lower layer.

Provision of a conventional undercoating layer for a magnetic recording medium is also preferably effected. The purpose of the undercoating layer is to improve the adhesiveness between the support and the overlying layers including the magnetic layer. The thickness of the undercoating layer is typically 0.5 µm or less. Therefore, the undercoating layer is different from the lower non-magnetic layer of the medium of the present invention. Also, in the magnetic recording medium of the present invention, provision of such an undercoating layer directly on the support is preferred so as to enhance the adhesiveness between the lower non-magnetic layer and the support.

As the ferromagnetic powder to be used in the magnetic layer of the medium of the present invention, known ferromagnetic powders are suitable, such as a magnetic iron oxide FeOx (x=1.33 to 1.5), a Co-modified FeOx (x=1.33 to 1.5), a ferromagnetic alloy powder consisting essentially of Fe, Ni or Co (in an amount of 75% or more), a barium ferrite powder and a strontium ferrite powder. Of these, especially preferred is a ferromagnetic alloy powder. The ferromagnetic powder for use in the present invention may contain, in addition to the principal atoms, any other atoms of Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and/or B.

The ferromagnetic powder may previously be treated with a dispersing agent, a lubricant, a surfactant and/or an antistatic agent prior to dispersion, as mentioned below. Such a pre-treatment is described in, for example, JP-B-44-14090, JP-B-45-18372, JP-B-47-22062, JP-B-47- 22513, JP-B-46-28466, JP-B-46-38755, JP-B-47-4286, JP-B- 47-12422, JP-B-47-17284, JP-B-47-18509, JP-B-47-18573, JP-B-39-10307, JP-B-48-39639 (the term "JP-B" as used herein means an "examined Japanese patent publication"), and U.S. Pat. Nos. 3,026,215, 3,031,341, 3,100,194, 3,242,005, 3,389,014.

Of the above-mentioned ferromagnetic powders, the ferromagnetic alloy powder may contain a small amount of hydroxide(s) and/or oxide(s). The ferromagnetic alloy powder for use in the present invention may be prepared by known methods, which are, for example, (a) a method of reducing a composite organic acid salt (essentially, oxalates) with a reducing gas such as hydrogen, (b) a method of reducing iron oxide with a reducing gas such as hydrogen to give Fe or Fe-Co particles, (c) a method of thermal-decomposing a metal carbonyl compound, (d) a method of adding a reducing agent such as sodium borohydride, a hydrophosphite or hydrazine to an aqueous solution of a ferromagnetic metal to reduce the metal, and (e) a method of vaporizing a metal in a low pressure inert gas to obtain a fine powder of the metal. The thus-obtained ferromagnetic alloy powder may be subjected to a known gradual oxidation treatment, for example, by a method of dipping the powder in an organic solvent followed by drying, a method of dipping the powder in an organic solvent followed by applying an oxygen-containing gas so as to form an oxide film on the surface thereof and drying the coated powder, or a method of forming an oxide film on the surface of the powder by adjusting the partial pressure of an oxygen gas and an inert gas as applied to the powder without using an organic solvent.

The ferromagnetic powder of the upper magnetic layer of the medium of the present invention has a specific surface area by BET method of generally from 25 to 80 $m^2/g$, preferably from 35 to 70 $m^2/g$. If the specific surface area is less than 25 $m^2/g$, the noise can be unduly accentuated. If, on the contrary, if it is more than 80 $m^2/g$, the surface property would be unfavorably poor. The crystallite size of the ferromagnetic powder of the upper magnetic layer of the medium of the present invention is generally from 100 to 450 Å, preferably from 100 to 350 Å. Saturation magnetization σs of the iron oxide magnetic powder is generally 50 emu/g or more, preferably 70 emu/g or more; and that of the ferromagnetic metal powder for use in the present invention is preferably 100 emu/g or more, more preferably from 110 emu/g to 170 emu/g. The coercive force Hc of the ferromagnetic metal powder is preferably from 1100 Oe to 2500 Oe, more preferably from 1400 Oe to 2000 Oe. The acicular ratio of the ferromagnetic powder for use in the present invention is preferably 18 or less, more preferably 12 or less.

The ferromagnetic powder is desired to have a r1500 of being generally 1.5 or less, more preferably 1.0 or less. The r1500 indicates the amount of the remanent magnetization (%) without being reversed, when the magnetic recording medium has been subjected to saturated magnetization and then a magnetic field of 1500 Oe of the reversed direction is applied thereto.

The water content of the ferromagnetic powder is desired to fall within the range of from 0.01 to 2%. Depending upon the kind of the binder to be used along with the ferromagnetic powder, the water content of the powder is desired to be optimized. The tap density of γ-iron oxide for use in the present invention is desired to be 0.5 g/ml or more, more preferably 0.8 g/ml or more. Where an alloy powder is used as the ferromagnetic powder, the tap density thereof is desired to be from 0.2 to 0.8 g/ml. If the tap density is more than 0.8 g/ml, oxidation of the ferromagnetic powder would progress too extensively during the densification of the powder so that a sufficient saturated magnetization (σs) could hardly be attained. If the tap density is less than 0.2 g/ml, dispersion of the powder would often be insufficient.

Where γ-iron oxide is used, the ratio of the divalent iron, if any, to the trivalent iron therein is preferably from 0 to 20%, more preferably from 5 to 10%. The ratio of the cobalt atoms, if any, to the iron atoms is preferably from 0 to 15%, more preferably from 2 to 8%.

The pH value of the ferromagnetic powder is desirably optimized, depending upon its particular combination with the binder. The range of the pH value is generally from 4 to 12, preferably from 6 to 10. The ferromagnetic powder may optionally be surface-treated with agents such as Al, Si, P and/or oxides of them. The amount of the agent for the surface-treatment is from 0.1 to 10% based on the amount of ferromagnetic powder. The surface-treatment of the powder is preferred, since the adsorption amount of a lubricant such as fatty acids to the powder otherwise may be 100 mg/m$^2$ or less. The ferromagnetic powder often contains soluble inorganic ions such as Na, Ca, Fe, Ni and/or Sr ions. However, such ions have no influence on the characteristics of the powder, provided that the content of them therein is 500 ppm or less.

The ferromagnetic powder for use in the present invention is desired to be less porous, and the porosity in the ferromagnetic powder is desired to be 20% by volume or less, more preferably 5% by volume or less. The shape of the ferromagnetic powder is not specifically defined and may be any of acicular, granular, ellipsoidal or tabular, provided that the powder satisfies the characteristics of the previously mentioned particle size. Where an acicular ferromagnetic powder is used, the acicular ratio thereof is desired to be 12 or less. In order that the ferromagnetic powder for use in the present invention may have SFD being 0.6 or less, the distribution of Hc of the powder is needed to be narrow. To accomplish this, various methods may be employable. For instance, the particle size distribution of goethite is narrowed, sintering of γ-hematite is prevented, and the coating speed of cobalt to iron oxide for cobalt modification is retarded.

In the present invention, also usable, as tabular hexagonal ferrites, are various substituted ferrites such as barium ferrite, strontium ferrite, lead ferrite and calcium ferrite, as well as Co-substituted ferrites and hexagonal Co-ferrite powder. Specifically mentioned are magnetoplumbite type barium ferrite and strontium ferrite, as well as partially spinel phase-containing magnetoplumbite type barium ferrite and strontium ferrite. Of them, especially preferred are substituted ferrites of barium ferrite and strontium ferrite. Various elements such as Co-Ti, Co-Ti-Zr, Co-Ti-Zn, Ni-Ti-Zn or Ir-Zn may be added to the preceding hexagonal ferrites so as to control their coercive force.

A hexagonal ferrite generally comprises 6-angular tabular particles, and the particle size diameter means the width of the major plane of each 6-angular tabular particle and is measured with an electronic microscope. The particles to be used in the present invention are preferably defined to those having a particle size of from 0.01 to 0.2 μm, especially preferably from 0.03 to 0.1 μm. The mean thickness (tabular thickness) of the fine particles is preferably from about 0.001 to 0.2 μm, especially preferably from about 0,003 to 0.05 μm. The aspect ratio (tabular diameter/tabular thickness) is generally from 1 to 10, preferably from 3 to 7. The fine hexagonal ferrite powder has a specific surface area by BET method (SBET) of preferably from 25 to 70 m$^2$/g, and a specific gravity of preferably from 4 to 6.

The binder to be used in the present invention for the upper magnetic layer and lower non-magnetic layer may be selected independently any known thermoplastic resin, thermosetting resin or reactive resin or a mixture of them. The thermoplastic resin for use in the present invention is one having a glass transition temperature of generally from −100° to 150° C., a number average molecular weight of generally from 1,000 to 200,000, preferably from 10,000 to 100,000, and a polymerization degree of approximately from 50 to 1000. Examples thereof include polymers or copolymers comprising constitutive units of vinyl chloride, vinyl acetate, vinyl alcohols, maleic acid, acrylic acid, acrylates, vinylidene chloride, acrylonitrile, methacrylic acid, methacrylates, styrene, butadiene, ethylene, vinyl butyrals, vinyl acetals and/or vinyl ethers, as well as polyurethane resins and various rubber resins. Examples of thermosetting resins and reactive resins for use in the present invention include phenolic resins, epoxy resins, hardening type polyurethane resins, urea resins, melamine resins, alkyd resins, acrylic reactive resins, formaldehyde resins, silicone resins, epoxypolyamide resins, mixtures of polyester resins and isocyanate prepolymers, mixtures of polyester polyols and polyisocyanates, and mixtures of polyurethanes and polyisocyanates.

These resins are described in detail in Plastic Handbook (published by Asakura Shoten). Known electronic ray-hardening resins may be incorporated into the lower layer or upper layer of the medium of the present invention. Examples thereof including a method of preparation are described in detail in JP-A-62-256219. The above-mentioned resins may be used singly or in combination of them in the present invention. Of these, preferred are a combination of a polyisocyanate and at least one selected from the group consisting of vinyl chloride resins, vinyl chloride-vinyl acetate resins, vinyl chloride-vinyl acetate-vinyl alcohol resins and vinyl chloride-vinyl acetate-maleic anhydride copolymers, and a polyurethane resin, and combination thereof.

Examples of polyurethane resins for use in the present invention include known polyester polyurethanes, polyether polyurethanes, polyether polyester polyurethanes, polycarbonate polyurethanes, polyester polycarbonate polyurethanes and polycaprolactone polyurethanes. In order to attain even further improved dispersibility and durability, it is preferred, optionally, to introduce into the binders exemplified herein at least one or more polar groups selected from COOM, $SO_3M$, $OSO_3M$, $P=O(OM)_2$, $O-P=O(OM)_2$ (wherein M is a hydrogen atom or an alkali metal), OH, $NR_2$, $N+R_3$ (wherein R is a hydrocarbon residue), an epoxy group, SH and CN by copolymerization or addition reaction. The amount of such polar groups in the binder, if any, is generally from $1\times10^{-1}$ to $1\times10^{-8}$ mol/g, preferably from $1\times10^{-2}$ to $1\times10^{-6}$ mol/g.

Specific examples of the binders for use in the present invention include VAGH, VYHH, VMCH, VAGF, VAGD, VROH, VYES, VYNC, VMCC, XYHL, XYSG, PKHH, PKHJ, PKHC, PKFE manufactured by Union Carbide Co., Ltd.; MPR-TA, MPR-TA5, MPR-TAL, MPR-TSN, MPR-TMF, MPR-TS, MPR-TM, MPR-TAO manufactured by Nisshin Chemical Industry Co., Ltd.; 1000W, DX80, DX81, DX82, DX83, 100FD manufactured by Electro Chemical Industry Co., Ltd.; MR105, MR110, MR100, 400X100A manufactured by Nippon Zeon Co., Ltd.; NIPPOLLAN N2301, N2302, N2304 manufactured by Nippon Polyurethane Co., Ltd.; PANDEX T-5105, T-R3080, T-5201, VERNOCK D-400, D-210-80, CRISVON 6109, 7209 manufactured by Dai-Nippon Ink and Chemical Inc.; BYLON UR8200, UR8300, UR8600, UR5500, UR4300, RV530, RV280 manufactured by Toyobo Co., Ltd.; DAIPHERAMINE 4020, 5020, 5100, 5300, 9020, 9022, 7020 manufactured by Dainichi Seika Co., Ltd.; MX5004 manufactured by Mitsubishi Chemical Corporation; SUNPRENE SP-150 manufactured by Sanyo Chemical Industries Co., Ltd.; and SALAN F310, F210 manufactured by Asahi Chemical Industry Co., Ltd.

The proportion of the binder in the upper magnetic layer of the medium of the present invention is generally from 5 to 50% by weight, preferably from 10 to 30% by weight, based on the ferromagnetic powder therein. Where vinyl chloride resins are used, the proportion is from 5 to 30% by weight; where polyurethane resins are used, it is from 2 to 20% by weight; and where polyisocyanates are used, it is from 2 to 20% by weight. A combination thereof is preferably used.

The proportion of the non-magnetic powders in the lower non-magnetic layer of the medium of the present invention is generally from 20 to 0.1 by weight, preferably from 15 to 0.5 by weight and more preferably from 10 to 1 by weight, and generally from 10 to 0.1 by volume, preferably from 8 to 0.5 by volume and more preferably from 5 to 1 by volume, based on the amount of binder in the lower layer.

Where polyurethane resins are used in the present invention, they preferably have a glass transition temperature of from −50° to 100° C., a breaking point elongation of from 100 to 2000%, a breaking point stress of from 0.05 to 10 kg/cm$^2$, and an yield value of from 0.05 to 10 kg/cm$^2$.

The magnetic recording medium of the present invention basically comprises two layers, but may comprise three or more layers. As constitution of the medium comprising three or more layers, the upper magnetic layer is composed of two or more plural magnetic layers. In this case, common knowledge of plural magnetic layer designs can apply to the relationship between the uppermost layer and the other lower magnetic layers. For instance, the uppermost magnetic layer has a higher coercive force than the other lower magnetic layers, and the former contains a ferromagnetic powder having a smaller mean longer axis length and a smaller crystallite size than the latter. As the case may be, the lower non-magnetic layer of the medium of the present invention may be composed of plural non-magnetic layers. In principle, the medium is composed of the upper magnetic layer unit and the lower non-magnetic layer unit.

It is of course possible to vary the amount of the binder, the amounts of vinyl chloride resins, polyurethane resins, polyisocyanates and other resins in the binder, the molecular weight of each resin of constituting the magnetic layer, the amount of the polar groups, if any, in the binder, and the physical characteristics of the resins, in accordance with the needs and circumstances as between the particular lower layer and the particular upper magnetic layer.

Examples of polyisocyanates for use in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate and triphenylmethane triisocyanate; products of these isocyanates and polyalcohols; and polyisocyanates to be formed by condensation of these isocyanates. As commercial products of these isocyanates, there are CORONATE L, CORONATE HL, CORONATE 2030, CORONATE 2031, MILLIONATE MR, MILLIONATE MTL manufactured by Nippon Polyurethane Co., Ltd.; TAKENATE D-102, TAKENATE D-110N, TAKENATE D- 200, TAKENATE D-202 manufactured by Takeda Chemicals Industries Co., Ltd.; and DESMODUR L, DESMODUR IL, DESMODUR N, DESMODUR HL manufactured by Sumitomo Bayer Co., Ltd. These polyisocyanates can be incorporated into the lower non-magnetic layer and the upper magnetic layer, singly or in combination of two or more of them on the basis of the relative difference in the hardening reactivity between them.

The carbon black to be optionally used in the upper magnetic layer of the medium of the present invention may be any of furnace black for rubbers, thermal black for rubbers, carbon black for coloration and acetylene black. It is preferred that the carbon black has a specific surface area of from 5 to 500 m$^2$/g, a DBP oil absorption amount of from 10 to 400 ml/100 g, a particle size of from 5 mμ to 300 mμ, a pH value of from 2 to 10, a water content of from 0.1 to 10% and a tap density of from 0.1 to 1 g/ml. Specific examples of the carbon black, include BLACKPEARLS 2000, 1300, 1000, 900, 800, 700, VULCAN XC-72 manufactured by Cabot Co., Ltd.; #80, #60, #55, #50, #35 manufactured by Asahi Carbon Co., Ltd.; #2400B, #2300, #900, #1000, #30, #40, #10B manufactured by Mitsubishi Chemical Corporation; and CONDUCTEX SC, RAVEN 150, 50, 40, 15 manufactured by Columbia Carbon Co., Ltd. The carbon black for use in the present invention may be surface-treated with a dispersing agent, or may be grafted with a resin, or the surface thereof may be partly graphatized. The carbon black may previously be dispersed in a binder prior to addition thereof to the magnetic coating solution. These carbon blacks may be used singly or in combination of two or more thereof. The amount of the carbon black in the magnetic layer is preferably from 0.1 to 30% based on the amount of the ferromagnetic powder therein. The carbon black acts for prevention of static charges, reduction of friction factor, impartation of light-shielding property and elevation of film strength. The action differs between the kinds of the carbon black to be used. Therefore, it is of course possible to differently incorporate various carbon blacks into the lower layer and the upper layer constituting the medium of the present invention on the basis of the kind and amount of them and the way of combination of them and also on the basis of other various characteristics of them, such as the particle size, the oil absorption amount, the electro-conductivity and the pH value thereof, in accordance with the object desired. For the carbon blacks used in the upper layer of the medium of the present invention, for example, the disclosure of Carbon Black Handbook (published by Carbon Black Association) may be referred to.

The upper magnetic layer of the medium of the present invention may contain an abrasive. As such an abrasive, usable are various known materials having a Mohs' hardness of 6 or more, singly or in combination thereof. They include, for example, α-alumina having an alphatization degree of 90% or more, β-alumina, silicon carbide, chromium oxide, cerium oxide, α-iron oxide, corundum, synthetic diamond, silicon nitride, silicon carbide, titanium carbide, titanium oxide, silicon dioxide, and boron nitride. A composite of these abrasives (as prepared by surface-treating one abrasive with another abrasive) may also be used. The abrasives can contain any other compounds or elements other than the essential component, which may also be used in the present invention to attain the same effect, provided that the content of the essential component therein is 90% or more. The abrasives are desired to have a particle size of from 0.01 to 2 μm. If desired, a combination of plural abrasives each having a different particle size may be employed in the present invention. As the case may be, a single abrasive having a broad particle size distribution may also be used to attain the same effect. The abrasives are desired to have a tap density of from 0.3 to 2 g/ml, a water content of from 0.1 to 5%, a pH value of from 2 to 11, and a specific surface area of from 1 to 30 m$^2$/g. The shape of the abrasives for use in the present invention may be any of acicular, spherical or cubic one. Preferred are those having angular corners as the shape thereof, as such have high abrasiveness.

Specific examples of the abrasive for use in the present invention include AKP-20, AKP-30, AKP-50, HIT-50 manufactured by Sumitomo Chemical Co., Ltd.; G5, G7, S-1 manufactured by Nippon Chemical Industry Co., Ltd.; and TF-100, TF-140, 100ED, 140ED manufactured by Toda Kogyo Co., Ltd. It is, of course, possible to differently incorporate various abrasives of different kinds and different amounts in different combinations into the lower layer and the upper layer constituting the medium of the present invention, in accordance with the object desired. The abrasive may previously be dispersed in a binder prior to its addition into the magnetic coating solution. The amount of the abrasive particles present in the surface of the upper magnetic layer and the edges of the medium of the present invention is preferably 5 particles/100 $\mu m^2$ or more.

To the medium of the present invention may be added various additives, such as those having a lubricating effect, antistatic effect, dispersing effect or plasticizing effect. Examples of additives used in the present invention include molybdenum disulfide, tungsten disulfide, graphite, boron nitride, graphite fluoride, silicone oil, polar group-containing silicones, fatty acid-modified silicones, fluorine-containing silicones, fluorine-containing alcohols, fluorine-containing esters, polyolefins, polyglycols, alkylphosphates and their alkali metal salts, alkylsulfates and their alkali metal salts, polyphenyl ethers, fluorine-containing alkylsulfates and their alkali metal salts, monobasic fatty acids having from 10 to 24 carbon atoms (optionally unsaturated or branched) and their metal salts (with Li, Na, K, Cu), mono-, di-, tri-, tetra-, hepta- or hexa-alcohols having from 12 to 22 carbon atoms (optionally unsaturated or branched), alkoxy-alcohols having from 12 to 22 carbon atoms, fatty acid monoesters, fatty acid diesters or fatty acid triesters composed of monobasic fatty acids having from 10 to 24 carbon atoms (optionally unsaturated or branched) and anyone of mono-, di-, tri-, tetra-, hepta- or hexa-alcohols having from 2 to 12 carbon atoms (optionally unsaturated or branched), fatty acid esters of monoalkyl ethers of alkylene oxide polymers, fatty acid amides having from 8 to 22 carbon atoms, and aliphatic amines having from 8 to 22 carbon atoms. Specific examples thereof include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol are mentioned.

In addition, also usable in the present invention are nonionic surfactants such as alkylene oxides, glycerins, glycidols and alkylphenol-ethyleneoxide adducts; cationic surfactants such as cyclic amines, ester amides, quaternary ammonium salts, hydantoin derivatives, heterocyclic compounds, phosphoniums and sulfoniums; anionic surfactants of containing acid groups such as carboxylic acid group, sulfonic acid group, phosphoric acid group, sulfate group and phosphate group; and amphoteric surfactants such as amino acids, aminosulfonic acids, sulfuric acid or phosphoric acid esters of aminoalcohols and alkylbetains. These surfactants are described in detail in Surfactant Handbook (published by Sangyo Tosho KK). The lubricant and antistatic agent for use in the present invention need not necessarily be 100% pure. As the case may be, they may contain various impurities, in addition to the essential component, such as isomers, non-reacted materials, side products, decomposates and oxides. The content of the impurities in the agent is desired to be preferably 30% or less, more preferably 10% or less.

The lubricant and surfactant may differently be incorporated into the lower non-magnetic layer and the upper magnetic layer of constituting the medium of the present invention, with respect to the kind and amount of them, in accordance with the particular necessity. For instance, these additives may be incorporated into the necessary layers in such a way that different fatty acids each having a different melting point are incorporated differently in the lower non-magnetic layer and the upper magnetic layer so as to prevent bleeding of the coated layers, that different esters each having a different boiling point or having different polarity are incorporated therein also so as to prevent bleeding of the coated layers, that the amount of the surfactant to be in the coating solution is controlled to elevate the coating stability, and that the amount of the lubricant is made larger in the lower non-magnetic layer so as to elevate the lubricating effect. Needless to say, the illustrated embodiments herein are not to be considered limitative.

All or a part of the additives to be used in the layers constituting the medium of the present invention may be added to the coating solution at any step of preparing the solutions. For instance, they may be blended with a ferromagnetic powder prior to kneading; they may be added to a mixture of a ferromagnetic powder, a binder and a solvent during the step of kneading them; they may be added during dispersion or after dispersion; or they may be added immediately before coating. Examples of commercial products of the lubricant for use in the present invention include NAA-102, NAA-415, NAA-312, NAA- 160, NAA-180, NAA-174, NAA-175, NAA-222, NAA-34, NAA-35, NAA-171, NAA-122, NAA-142, NAA-160, NAA-173K, castor oil-hardened fatty acids, NAA-42, NAA-44, CATION SA, CATION MA, CATION AB, CATION BB, NYMEEN L-201, NYMEEN L-202, NYMEEN L-202, NYMEEN S-202, NONION E-208, NONION P-208, NONION S-207, NONION K-204, NONION NS-202, NONION NS-210, NONION HS-206, NONION L-2, NONION S-2, NONION S-4, NONION O-2, NONION LP-20R, NONION PP-40R, NONION SP-60R, NONION OP-80R, NONION OP-85R, NONION LT-221, NONION ST-221, NONION OT-221, MONOGURI MG, NONION DS-60, ANON BF, ANON LG, butyl stearate, butyl laurate, erucic acid manufactured by Nippon Oils & Fats Co., Ltd.; oleic acid by Kanto Chemical Co., Ltd.; FAL-205, FAL-123 by Takemoto Yushi Co., Ltd.; Enujerubu LO, Enujerubu IPM, Sansosyzer E4030 by Shin-Nippon Rika Co., Ltd.; TA-3, KF-96, KF-96L, KF- 96H, KF410, KF420, KF965, KF54, KF50, KF56, KF-907, KF- 851, X-22-818, X-22-822, KF-905, KF-700, KF-393, KF-857, KF-860, KF-865, X-22-980, KF-101, KF-102, KF-103, X-22- 3710, X-22-3715, KF-910, KF-3935 manufactured by Shin-Etsu Chemical Co., Ltd.; ARMIDE P, ARMIDE C, ARMOSLIP CP manufactured by Lion Armer Co., Ltd.; DUOMIN TDO manufactured by Lion Fat & Oil Co., Ltd.; BA-41G manufactured by Nisshin Oil Mills Co. Ltd.; and PROFAN 2012E, NEWPOLE PE61, IONET MS-400, IONET MO-200, IONET DL- 200, IONET DS-300, IONET DS-1000, IONET DO-200 manufactured by Sanyo Chemical Co., Ltd.

The coating solutions for the layers of the medium of the present invention can contain organic solvents in any desired proportion. Such organic solvents include, for example, ketones such as acetone, methyl ethyl ketone, methyl isobutyl ketone, diisobutyl ketone, cyclohexanone, isophorone, tetrahydrofuran; alcohols such as methanol, ethanol, propanol, butanol, isobutyl alcohol, isopropyl alcohol, methylcyclohexanol; esters such as methyl acetate, butyl acetate, isobutyl acetate, isopropyl acetate, ethyl lactate, glycol acetate; glycol ethers such as glycol dimethylether, glycol monoethylether, dioxane; aromatic hydrocarbons such as benzene, toluene, xylene, cresol, chlorobenzene; chlorinated hydrocarbons such as methylene chloride, ethylene chloride, carbon tetrachloride, chloroform, ethylene chlorohydrin, dichlorobenzene; and N,N-dimethylformamide and hexane. These organic solvents are not needed to be 100% pure ones but may contain various impurities, in addition to the main component, such as isomers, non-reacted materials, side products, decomposates, oxides and water. The content of the impurities therein is desired to be 30% by weight or less, more preferably 10% by weight or less. The kind and amount of the organic solvents to be in the upper layer and the lower layer of constituting the medium of the present invention may be varied. As examples of the ways of incorporating the organic solvents to the layers, mentioned are such that a more volatile solvent is used in the lower layer so as to elevate the surface property; a solvent having a higher surface tension (e.g., cyclohexanone, dioxane) is used in the magnetic layer so as to elevate the coating stability; and a solvent having a higher dissolution parameter is used in the magnetic layer so as to elevate the filling density. Needless to say, however, the illustrated examples herein are not limitative.

Regarding the thickness constitution of the magnetic recording medium of the present invention, the thickness of the non-magnetic support is generally from 1 to 100 μm, preferably from 4 to 20 μm, more preferably from 5 to 12 μm; the mean thickness of the lower layer is generally from 1 to 5 μm; and the mean thickness of the upper layer is generally from 0.05 μm to 1.0 μm, preferably from 0.05 μm to 0.6 μm, more preferably from 0.05 μm to 0.3 μm. The total thickness of both the upper layer and the lower layer is 1/100 to 2 times of the thickness of the non-magnetic support. An undercoating layer may be provided between the non-magnetic support and the lower layer so as to elevate the adhesion therebetween. The thickness of the undercoating layer is generally from 0.01 to 2 μm, preferably from 0.05 to 0.5 μm. A back coating layer may be provided on the back surface of the non-magnetic layer opposite to the magnetic layer. The thickness of the back coating layer is generally from 0.1 to 2 μm, preferably from 0.3 to 1.0 μm. Such an undercoating layer and a back coating layer may be conventional ones. It is effective to incorporate the powder (C), which is used in the lower layer, also into the back coating layer so as to better prevent the edge damage of the medium.

As the non-magnetic support of the medium of the present invention, usable are any known films of polyesters such as polyethylene terephthalate or polyethylene naphthalate, as well as polyolefins, cellulose triacetate, polycarbonates, polyamides, polyimides, polyamidoimides, polysulfones, aramides or aromatic polyamides. The support may previously be subjected to corona discharging treatment, plasma treatment, easy adhesion treatment, heat treatment, dust removing treatment, etc. In order to attain the object of the present invention, the non-magnetic support is one having a center line mean surface roughness of generally 0.03 μm or less, preferably 0.02 μm or less, more preferably 0.01 μm or less. In addition, it is desired that the support not only has such a small center line mean surface roughness but also does not have large projections of 1 μm or more. The roughness profile of the surface of the support may be freely controlled in accordance with the size and the amount of the filler to be added to the support, if desired. Examples of the filler include oxides and carbonates of Ca, Si and Ti, as well as organic fine powders of acrylic substances. The F-5 value (i.e., the load at the 5% elongation) of the non-magnetic support in the tape running direction is preferably from 5 to 50 kg/mm$^2$, and that in the tape-width direction is preferably from 3 to 30 kg/mm$^2$. In general, the F-5 value in the tape-running (lengthwise) direction is higher than that in the tape width direction. However, when the strength of the tape in the tape-width direction is desired to be high, this prescription shall not apply.

The thermal shrinkage (percentage) of the non-magnetic support in both the tape running direction and the tape width direction at 100° C. for 30 minutes is preferably 3% or less, more preferably 1.5% or less; and the same at 80° C. for 30 minutes is preferably 1% or less, more preferably 0.5% or less. The strength of the support at the breaking point is preferably from 5 to 100 kg/mm$^2$ in the both directions; and the modulus of elasticity of the same is preferably from 100 to 2000 kg/mm$^2$ in the both directions.

The process of producing the magnetic coating solution for the magnetic recording medium of the present invention comprises at least a kneading step, a dispersing step and optionally a mixing step to be provided before and after the preceding steps. The respective steps each may be composed of two or more stages. In producing the composition, all the raw materials of the ferromagnetic powder, binder, carbon black, abrasive, antistatic agent, lubricant and solvent may be added to the reactor initially at the start of the process or later during the course of the process. The individual raw materials may divided into plural divisions to be added in two or more steps of the process. For instance, polyurethane is divided into plural divisions and added in the kneading step and dispersing step and also in the mixing step for adjustment of the viscosity after dispersion.

For attaining the object of the present invention, any known conventional technology may of course be employed as a part of the process of producing the magnetic recording medium of the present invention. For instance, in the kneading step, a kneading machine having a strong kneading power, such as a continuous kneader or a pressure kneader, may be employed so as to obtain the magnetic recording medium with high Br of the present invention. Where such a continuous kneader or a pressure kneader is employed, a ferromagnetic powder is kneaded with all or a part (preferably 30% by weight or more) of a binder. For instance, 100 parts by weight of a ferromagnetic powder is blended with from 15 to 500 parts by weight of a binder. The details of the kneading technology are described in JP-A-1-106338 and JP-A-64- 79274.

As examples of the apparatus and process for producing the magnetic recording medium of the present invention, which is composed of plural layers coated on a support, the following are referred to.

1. A lower layer is first coated on a support with a gravure coating, roll coating, blade coating or extrusion coating device, which is generally employed for coating a magnetic coating composition, and while the coated lower layer is still wet, an upper layer is coated thereover with a support-pressing extrusion coating device as illustrated in JP-B-1-46186 and JP-A-60-238179 and JP-A- 2-265672.

2. A lower layer and an upper layer are almost simultaneously coated on a support with one coating head having therewith two coating solution passing slits, as illustrated in JP-A-63-88080, JP-A-2-17921 and JP-A-2- 265672.

3. A lower layer and an upper layer are almost simultaneously coated on a support with a back-up roll-equipped extrusion coating device as illustrated in JP-A- 2-174965.

In order to prevent lowering of the electromagnetic characteristics of the magnetic recording medium due to aggregation of the ferromagnetic powder coated, it is desired to apply a shearing force to the coating solution in the inside of the coating head by the method described in JP-A-62-95174 and JP-A-1-236968. The viscosity of the coating solution is desired to satisfy the numerical range as disclosed in JP-A-3-8471.

In order to obtain the medium of the present invention, strong orientation is necessary. For this purpose, a solenoid of 1000 G (gauss) or more and a cobalt magnet of 2000 G or more are used in combination. In order that the orientation of the dried medium may be the highest, it is preferred that the medium is previously suitably dried prior to orientation. Where the medium of the present invention is a disc, randomizing orientation is typically necessary.

As calendering rolls to be used in producing the medium of the present invention, usable are heat-resistant plastic rolls made of epoxy, polyimide, polyamide or polyimidoamide resins. Calendering may also be effected between two metal rolls. The calendering temperature is preferably 70° C. or higher, more preferably 80° C. or higher. The linear pressure for calendering is preferably 200 kg/cm or more, more preferably 300 kg/cm or more.

The coefficient of friction against SUS420J, of the upper layer of the magnetic recording medium and that of the opposite surface of the same are preferably 0.5 or less, more preferably 0.3 or less. The surface intrinsic resistance of the magnetic layer is preferably from $1 \times 10^4$ to $1 \times 10^{11}$ Ω/sq. The modulus of elasticity of the magnetic layer at 0.5% elongation is preferably from 100 to 2000 kg/mm² both in the running direction and the width direction; the strength of the layer at the breaking point is preferably from 1 to 30 kg/cm²; the modulus of elasticity of the magnetic recording medium of the invention is preferably from 100 to 500 kg/mm² in both the running direction and the width direction; the residual elongation of the same is preferably 0.5% or less; the thermal shrinkage (percentage) of the same at every temperature of 100° C. or lower is preferably 1% or less, more preferably 0.5% or less, most preferably 0.1% or less.

The content of the solvent remaining in the upper layer of the medium of the present invention is preferably 100 mg/m² or less, more preferably 10 mg/m² or less; and the amount of the remaining solvent in the upper layer is desired to be smaller than that in the lower layer.

The voidage of the upper layer and that of the lower layer each are preferably 30% by volume or less, more preferably 20% by volume or less. The voidage of the lower layer is preferably smaller than that of the upper magnetic layer. As the case may be, the voidage of the lower layer may often be higher than that of the upper layer, depending upon the object. For instance, for a magnetic recording medium for recording data, for which repeated use is considered important, the reverse relationship is often preferred.

Regarding the magnetic characteristics of the magnetic recording medium of the present invention as measured in a magnetic field of 5 KOe, the squareness ratio in the tape running direction is generally 0.70 or more, preferably 0.80 or more, more preferably 0.90 or more. The squareness ratio in the two directions perpendicular to the tape running direction is desired to be 80% or less of that in the tape running direction. The SFD of the magnetic layer is desired to be 0.6 or less.

The center line mean surface roughness (Ra) of the magnetic layer is desired to be from 2 nm to 20 nm, and the value is to be suitably defined in accordance with the object. For improving the electromagnetic characteristics, Ra is desired to be smaller. However, for improving the running durability, Ra is desired to be larger. RMS surface roughness ($R_{RMS}$) of the magnetic layer as obtained by STM evaluation is desired to fall within the range of from 3 nm to 16 nm.

The present invention will be explained in more detail by way of the following examples, which, however, are not intended to restrict the scope of the present invention. Unless otherwise specifically indicated, all "parts" are "parts by weight".

EXAMPLE 1

A coating solution for the lower non-magnetic layer and a coating solution for the upper magnetic layer were prepared, each having the composition described below.

| Coating Solution for Lower Non-magnetic Layer: | |
| --- | --- |
| Inorganic powder (powder A) $TiO_2$<br>mean particle size: 0.035 μm<br>type of crystal: rutile<br>$TiO_2$ content: 90% or more<br>specific surface area by BET method: 40 m²/g<br>DBP oil absorption amount: 27 to 38 g/100 g<br>pH 7<br>surface-treating agent: $Al_2O_3$ | 75 parts |
| Carbon Black (powder B)<br>mean particle size: 16 mμ<br>DBP oil absorption amount: 80 ml/100 g<br>pH 8.0<br>specific surface area by BET method: 250 m²/g<br>olatile content: 1.5% | 15 parts |
| Coarse particles (powder C)<br>α-$Al_2O_3$ (HIT-55, by Sumitomo Chemical Co., Ltd.)<br>mean particle size: 0.2 μm<br>specific surface area by BET method: 9 m²/g | 10 parts |
| Vinyl chloride-vinyl acetate-vinyl<br>alcohol copolymer<br>containing $5 \times 10^{-6}$ eg/g of polar<br>group —$N(CH_3)_3^+Cl^-$<br>composition ratio: 86/13/1<br>polymerization degree: 400 | 12 parts |
| Polyester polyurethane resin<br>neopentyl glycol/caprolactone polyol/<br>MDI = 0.9/2.6/1<br>containing $1 \times 10^{-4}$ eq/g of —$SO_3Na$ group | 5 parts |
| Butyl Stearate | 1 part |
| Stearic Acid | 1 part |
| Methyl Ethyl Ketone | 200 parts |
| Coating Solution for Upper Magnetic Layer: | |
| Fine Powder of Ferromagnetic Metal<br>with composition of Fe/Zn/Ni = 92/4/4<br>Hc: 1600 Oe<br>specific surface area by BET method: 60 m²/g<br>crystallite size: 195 Å<br>mean length in the long axis: 0.20 μm<br>acicular ratio: 10<br>saturated magnetization (σs): 130 emu/g | 100 parts |
| Vinyl Chloride Copolymer<br>containing $1 \times 10^{-4}$ eq/g of —$SO_3Na$ group<br>polymerization degree: 300 | 12 parts |
| Polyester Polyurethane Resin<br>neopentyl glycol/caprolactone polyol/<br>MDI = 0.9/2.6/1<br>containing $1 \times 10^{-4}$ eq/g of —$SO_3Na$ group | 3 parts |
| α-alumina (mean particle size 0.3 μm) | 2 parts |
| Carbon Black (mean particle size 0.10 μm) | 0.5 part |
| Butyl Stearate | 1 part |
| Stearic Acid | 2 parts |
| Methyl Ethyl Ketone | 200 parts |

Each of the preceding two coating solutions was kneaded in a continuous kneader and then dispersed with a sand mill. Polyisocyanate was added to the both dispersions thus obtained, in an amount of one part to the dispersion for the coating solution of the lower non-magnetic layer and in an amount of 3 parts to that for the coating solution of the upper magnetic layer. Further, 40 parts of butyl acetate was added to each of them. These dispersions were then filtered each through a filter having a mean pore size of 1 μm. Thus, a coating solution for the lower non-magnetic layer and a coating solution for the upper magnetic layer were prepared.

The coating solution for the lower non-magnetic layer was coated on a polyethylene terephthalate support having a thickness of 7 μm and a center line mean surface roughness of 0.01 μm, in a dry thickness of 2 μm and, immediately after the coating, the coating solution for the upper magnetic layer was coated thereover in a dry thickness of 0.5 μm, by simultaneous multi-coating method. While the both layers were still wet, the coated support was oriented with a cobalt magnet having a magnetic power of 3000 G and a solenoid having a magnetic power of 1500 G. The oriented coated support was then dried and calendered with a 7-stage calendering device composed of only metal rolls at a temperature of 90° C., and this was slit into a width of 8 mm to prepare a 8 mm video tape of Example 1-1.

In the same manner as above, samples of Examples 1-2 to 1-8 and comparative samples of Comparative Examples 1-1 to 1-9 were prepared, except that the factors as indicated in Tables 1 to 3 below were used. These samples were tested by the methods mentioned below, and the results obtained are shown in Tables 1 to 3.

1. Volume Ratio of Powders A, B and C

The volume of each powder was calculated by dividing the respective weight ratio of each of the components constituting the lower non-magnetic layer by the true specific gravity of each powder, and the volume ratio of the respective powder components was obtained on the basis of the sum of the powder volume being 100%.

2. 7 MHz Output Power

Using a 8 mm video deck of "FUJIX8" (manufactured by Fuji Photo Film Co., Ltd.), a 7 MHz signal was recorded on each sample and the recorded signal was reproduced, whereupon the 7 MHz signal reproducing power was measured with an oscilloscope. As a control, used was a 8 mm tape SAG P6-120 (manufactured by Fuji Photo Film Co., Ltd.).

3. C/N Ratio

Using a 8 mm video deck of FUJIX8 Model (manufactured by Fuji Photo Film Co., Ltd.), a 7 MHz signal was recorded on each sample and the recorded signal was reproduced, whereupon the noise as generated at 6 MHz was measured with a spectroanalyzer. The ratio of the reproduced signal to the noise was determined.

4. Still Durability

Using a 8 mm video deck of "FUJIX8" (manufactured by Fuji Photo Film Co., Ltd.), a 7 MHz signal was recorded on each sample in an atmosphere of 5° C. and 80% RH, and the recorded signal was reproduced by still mode, whereupon the time spent for lowering the output power by 6 dB or more was measured to be the still life. The measurement was finished in 60 minutes.

5. Running Durability

Each sample was run through ten "FUJIX8" 8 mm video decks (all manufactured by Fuji Photo Film Co., Ltd.) 100 times for each, in an atmosphere of 23° C. and 70% RH. During the running test, decrease of the output was measured. After the test, the parts of each deck were checked as to whether or not and how they got soiled and the edge damage, if any, of the tested sample was also checked.

In Table 3 below, "G" indicates that the decrease of the output power was 3 dB or less and the soiling of the parts of each deck was not observable with the naked eye; "M" indicates that the depression of the output power was 3 dB or less but the parts of each deck were observed to get soiled with the naked eye; and "B" indicates that the depression of the output power was more than 3 dB and the parts of each deck were soiled extensively.

TABLE 1

|  | Ex. 1-1 | Ex. 1-2 | Ex. 1-3 | Ex. 1-4 | Ex. 1-5 | Comp. Ex. 1-1 | Comp. Ex. 1-2 | Comp. Ex. 1-3 | Comp. Ex. 1-4 |
|---|---|---|---|---|---|---|---|---|---|
| Powder A | | | | | | | | | |
| kind | $TiO_2$ | $TiO_2$ | $TiO_2$ | $TiO_2$ | $TiO_2$ | $TiO_2$ | $TiO_2$ | $TiO_2$ | $TiO_2$ |
| specific gravity | 4.2 | 4.2 | 4.2 | 4.2 | 4.2 | 4.2 | 4.2 | 4.2 | 4.2 |
| mean particle size (μm) | 0.035 | 0.021 | 0.075 | 0.035 | 0.035 | 0.1 | 0.035 | 0.035 | 0.009 |
| content, as weight ratio | 75 | 75 | 75 | 75 | 75 | 75 | 75 | 75 | 75 |
| volume ratio (%) | 62.8 | 62.8 | 62.8 | 62.8 | 62.8 | 62.8 | 62.8 | 62.8 | 62.8 |
| Powder B | | | | | | | | | |
| mean particle size (μm) | 0.016 | 0.016 | 0.016 | 0.033 | 0.016 | 0.016 | 0.045 | 0.016 | 0.016 |
| content, as weight ratio | 15 | 15 | 15 | 15 | 15 | 15 | 15 | 15 | 15 |
| volume ratio (%) | 28.4 | 28.4 | 28.4 | 28.4 | 28.4 | 28.4 | 28.4 | 28.4 | 28.4 |
| Powder C | | | | | | | | | |
| kind | $\alpha Al_2O_3$ | $\alpha Al_2O_3$ | $\alpha Al_2O_3$ | $\alpha Al_2O_3$ | $\alpha Al_2O_3$ | $\alpha Al_2O_3$ | $\alpha Al_2O_3$ | $\alpha Al_2O_3$ | $\alpha Al_2O_3$ |
| specific gravity | 4 | 4 | 4 | 4 | 4 | 4 | 4 | 4 | 4 |
| mean particle size (μm) | 0.2 | 0.2 | 0.2 | 0.2 | 0.8 | 0.2 | 0.2 | 1 | 1 |
| shape | cubic | cubic | cubic | cubic | cubic | cubic | cubic | cubic | cubic |
| content, as weight ratio | 10 | 10 | 10 | 10 | 10 | 10 | 10 | 10 | 10 |
| volume ratio (%) | 8.8 | 8.8 | 8.8 | 8.8 | 8.8 | 8.8 | 8.8 | 8.8 | 8.8 |

TABLE 2

|  | Comp. Ex.1-5 | Comp. Ex.1-6 | Ex.1-6 | Ex.1-7 | Comp. Ex.1-7 | Comp. Ex.1-8 | Ex.1-8 | Comp.Ex. 1-9 |
|---|---|---|---|---|---|---|---|---|
| Powder A | | | | | | | | |
| kind | $TiO_2$ | $TiO_2$ | $TiO_2$ | $TiO_2$ | $TiO_2$ | $\alpha Fe_2O_3$ | $\alpha Fe_2O_3$ | — |
| specific gravity | 4.2 | 4.2 | 4.2 | 4.2 | 4.2 | 5.1 | 5.1 | — |
| mean particle size (μm) | 0.035 | 0.035 | 0.035 | 0.035 | 0.035 | 0.05 | 0.05 | — |
| content, as weight ratio | 75 | 75 | 75 | 75 | 75 | 90 | 80 | 0 |
| volume ratio | 62.8 | 62.8 | 62.8 | 64.0 | 62.8 | 76.6 | 63.4 | 0.0 |
| Powder B | | | | | | | | |
| mean particle size (μm) | 0.009 | 0.016 | 0.016 | 0.016 | 0.016 | 0.016 | 0.016 | 0.016 |
| content, as weight ratio | 15 | 15 | 15 | 15 | 15 | 10 | 15 | 50 |
| volume ratio (%) | 28.4 | 28.4 | 28.4 | 28.9 | 28.4 | 23.4 | 32.6 | 72.9 |
| Powder C | | | | | | | | |
| kind | $\alpha Al_2O_3$ | $\alpha Al_2O_3$ | $TiO_2$ | $\alpha Fe_2O_3$ | $\alpha Al_2O_3$ | $\alpha Al_2O_3$ | $\alpha Fe_2O_3$ | $\alpha FeOOH$ |
| specific gravity | 4 | 4 | 4 | 5.1 | 4 | 4 | 5.1 | 5 |
| mean particle size (μm) | 1 | 0.06 | | | 0.2 | 0.2 | 0.4 | |
| shape | cubic | cubic | acicular | tabular | cubic | cubic | cubic | acicular |
| size(*) | | | 0.06 | 1 | | | | 0.023 |
| aspect ratio | | | 15 | 14 | | | | 13 |
| content, as weight ratio | 10 | 10 | 10 | 10 | 10 | 0 | 5 | 50 |
| volume ratio (%) | 8.8 | 8.8 | 8.8 | 7.0 | 8.8 | 0.0 | 4.0 | 27.1 |

*size (μm): tabular diameter or length in the long axis

TABLE 3

|  | Ex.1-1 | Ex.1-2 | Ex.1-3 | Ex.1-4 | Ex.1-5 | Comp. Ex.1-1 | Comp. Ex.1-2 | Comp. Ex.1-3 | Comp. Ex.1-4 |
|---|---|---|---|---|---|---|---|---|---|
| Thickness of Upper Magnetic Layer (μm) | 0.5 | 0.5 | 0.5 | 0.5 | 0.5 | 0.5 | 0.5 | 0.5 | 0.5 |
| Thickness of Lower Non-magnetic Layer (μm) | 2 | 2 | 2 | 2 | 2 | 2 | 2 | 2 | 2 |
| Coating Method (*) | Multi-coating | Multi-coating | Multi-coating | Multi-coating | Multi-coating | Multi-coating | Multi-coating | Multi-coating | Multi-coating |
| Evaluation | | | | | | | | | |
| 7 MHz Output (dB) | 6.5 | 7.1 | 6.3 | 6 | 6.3 | 3.5 | 2.9 | 3.1 | 2.5 |
| C/N Ratio (dB) | 6.1 | 6.6 | 6 | 6.1 | 5.8 | 2.9 | 2.5 | 2.6 | 2.8 |
| Still Durability | 60 min. or more | 60 min. or more | 60 min. or more | 60 min. or more | 60 min. or more | 60 min. or more | 60 min. or more | 60 min. or more | 60 min. or more |
| Running Durability | G | G | G | G | G | G | G | G | G |

|  | Comp. Ex.1-5 | Comp. Ex.1-6 | Ex.1-6 | Ex.1-7 | Comp. Ex.1-7 | Comp. Ex.1-8 | Ex.1-8 | Comp. Ex.1-9 |
|---|---|---|---|---|---|---|---|---|
| Thickness of Upper Magnetic Layer (μm) | 0.5 | 0.5 | 0.5 | 0.5 | 0.5 | 0.5 | 0.5 | 0.5 |
| Thickness of Lower Non-magnetic Layer (μm) | 2 | 2 | 2 | 2 | 2 | 2 | 2 | 2 |
| Coating Method (*) | Multi-coating | Multi-coating | Multi-coating | Multi-coating | Multi-coating | multi-coating | Multi-coating | Multi-coating |
| Evaluation | | | | | | | | |
| 7 MHz Output (dB) | 1.5 | 6.5 | 5.9 | 6.1 | — | 6.2 | 6 | 1.5 |
| C/N Ratio (dB) | 2 | 6 | 6.2 | 6 | — | 5.9 | 6.3 | 2 |
| Still Durability | 60 min. or move | 60 min. or more | 60 min. or more | 60 min. or more | — | 25 min. | 60 min. or more | 60 min. or more |
| Running Durability | G | B | G | G | — | B | G | G |

*Coating Method: Examples 1-1 to 1-8 and Comparative Examples 1-1 to 1-6 and 1-8 to 1-9; Simultaneous multi-coating Comparative Example 1-7; Successive muli-coating As is apparent from the results of Tables 1 to 3 above, the samples of the present invention have high reproduction output power and C/N and have excellent still durability and running durability. The sample of Comparative Example 1-1, containing an inorganic powder having a larger size than the claimed defined range as the powder (A), has poor electromagnetic characteristics. The sample of Comparative Example 1-2, containing a carbon black having a larger size than the claimed range, also has poor electromagnetic characteristics. The sample of Comparative Example 1-3, containing the powder (C) having a large size, also has poor electromagnetic characteristics. The sample of Comparative Example 1-4, containing the powder (A) having a small size, also has poor electromagnetic characteristics. The sample of Comparative Example 1-5, containing the powder (B) having a small size, also has poor electromagnetic characteristics. The sample of Comparative Example 1-6, containing the powder (C) having a small size, also has poor running durability. The sample of Comparative Example 1-7, as being formed by successive coating of coating the upper layer after the previously coated lower layer has been dried, could not be evaluated by the determined methods. The sample of Comparative Example 8, not containing the powder (C), did not have improved still durability and running durability. The sample of Comparative Example 1-9, not containing the powder (A), has poor electromagnetic characteristics.

As explained in detail in the above, since the lower non-magnetic layer constituting the magnetic recording medium of the present invention is made of a particularly selected powder composition comprising particular powder components each of a specifically defined amount, the medium has improved still durability and running durability and has high reproduction output and C/N ratio. The medium therefore has an extremely thin magnetic layer as coated over the non-magnetic layer, which is comparable to a magnetic recording medium having a thin ferromagnetic metal layer coated on the support. The producibility of the magnetic recording medium of the present invention is excellent.

While the invention has been described in detail and with reference to specific embodiments thereof, it will be apparent to one skilled in the art that various changes and modifications can be made therein without departing from the spirit and scope thereof.

What is claimed is:

1. A magnetic recording medium containing a support having thereon in order a non-magnetic layer unit and a magnetic layer unit, said magnetic recording medium having been produced by providing a non-magnetic layer unit containing at least one non-magnetic layer and comprising a non-magnetic powder dispersed in a binder on a non-magnetic support followed by providing, while the non-magnetic layer is still wet, a magnetic layer unit containing at least one magnetic layer and comprising a ferromagnetic powder dispersed in a binder on the non-magnetic layer, wherein the mean thickness of the magnetic layer is 1.0 μm or less and the non-magnetic powder in the non-magnetic layer comprises (A) a granular inorganic powder having a mean particle size of from 0.01 to 0.08 μm, (B) a carbon black powder having a mean particle size of from 0.01 to 0–0.04 μm and (c) a powder component having a larger mean particle size than the mean particle size of each of powders (A) and (B).

2. The magnetic recording medium as claimed in claim 1, wherein the powder (C) comprises a granular or polyhedral powder having a particle size of from 0.07 μm to less than 1 μm.

3. The magnetic recording medium as claimed in claim 1, wherein the powder (C) comprises an acicular powder having a mean length in the long axis of from 0.05 μm to less than 1 μm and an aspect ratio of 10 or more.

4. The magnetic recording medium as claimed in claim 1, wherein the powder (C) comprises a tabular powder having a tabular diameter of from 0.1 μm to less than 2 μm and an aspect ratio of 10 or more.

5. The magnetic recording medium as claimed in claim 1, wherein respective volume proportions of the powders (A), (B) and (C) to the total volume of non-magnetic powders present in the non-magnetic layer is 40 to 80% of powder (A), 15 to 40% of powder (B) and 2 to 26% of powder (C).

6. The magnetic recording medium as claimed in claim 1, wherein the powder (A) is selected from the group consisting of titanium oxide, barium sulfate, silica, alumina, zinc oxide and α-iron oxide.

7. The magnetic recording medium as claimed in claim 1, wherein the support has a thickness of 1 to 100 μm, the non-magnetic layer has a mean thickness of 1 to 5 μm and the magnetic layer has a mean thickness of 0.05 to 1.0 μm.

8. The magnetic recording medium as claimed in claim 1, wherein the powder (A) is titanium oxide.

9. The magnetic recording medium as claimed in claim 1, wherein the powder (C) has a Mohs' hardness of 4 or more and a specific gravity of from 2 to 6.

10. The magnetic recording medium as claimed in claim 1, wherein the carbon black of powder (B) has a specific surface area of from 100 to 500 $m^2/g$, a DBP absorption of from 20 to 400 ml/g, a pH value of from 2 to 10, a water content of from 0.1 to 10% and a tap density of from 0.1 to 1 g/cc.

* * * * *